United States Patent
Bontempi et al.

(10) Patent No.: US 7,058,042 B2
(45) Date of Patent: Jun. 6, 2006

(54) ONE-TO-ONE COMMUNICATION

(75) Inventors: Richard Bontempi, Helsinki (FI); Jussi Löppönen, Helsinki (FI); Jarno Rajahalme, Kirkkonummi (FI); Hannu Töyrylä, Helsinki (FI); Markku Vimpari, Oulu (FI)

(73) Assignee: Nokia Corporation, Espoo (FI)

( * ) Notice: Subject to any disclaimer, the term of this patent is extended or adjusted under 35 U.S.C. 154(b) by 845 days.

(21) Appl. No.: 09/903,871

(22) Filed: Jul. 13, 2001

(65) Prior Publication Data
US 2002/0150092 A1    Oct. 17, 2002

Related U.S. Application Data

(63) Continuation-in-part of application No. 09/835,867, filed on Apr. 17, 2001.

(51) Int. Cl.
*H04Q 7/24* (2006.01)
(52) U.S. Cl. .................. 370/338; 370/349; 370/410; 370/352
(58) Field of Classification Search ................ 370/351, 370/352–356, 389, 338, 401, 410, 349
See application file for complete search history.

(56) References Cited

U.S. PATENT DOCUMENTS

| | | | |
|---|---|---|---|
| 6,141,347 A | | 10/2000 | Shaughnessy et al. |
| 6,363,065 B1 * | | 3/2002 | Thornton et al. ............ 370/352 |
| 6,621,796 B1 * | | 9/2003 | Miklos ........................ 370/236 |
| 6,735,291 B1 * | | 5/2004 | Schmid et al. ............... 379/189 |
| 2001/0048680 A1 * | | 12/2001 | Yoshimura et al. .......... 370/389 |
| 2002/0034166 A1 * | | 3/2002 | Barany et al. ............... 370/329 |
| 2002/0105943 A1 * | | 8/2002 | Womack et al. ............ 370/352 |
| 2002/0141369 A1 * | | 10/2002 | Perras ........................ 370/338 |

FOREIGN PATENT DOCUMENTS

WO     WO 02/32165     4/2002

OTHER PUBLICATIONS

ETSI TS 101 315 V1.1.1 (Mar. 2002), Telecommunications and Internet Protocol Harmonization Over Networks (TIPHON) Release 3; Functional entitites; information flow and reference point definitions; Guidelines for application of TIPHON functional architecture to inter-domain services, 43 pp.
Plasse, "Call Control Scenarios in the "all-IP" UMTS Core Network," BT Adastral park, UK, retrieved on Aug. 5, 2002.

* cited by examiner

*Primary Examiner*—Ajit Patel
(74) *Attorney, Agent, or Firm*—Pillsbury Winthrop Shaw Pittman LLP

(57) ABSTRACT

A packet mode (e.g. IP) communication service layer is provided on top of a standard mainstream cellular radio network. Conceptually, the communication layer comprises a pair of basic logical entities, an application bridge and a call processing server (CPS). The bridge and the CPS run packet mode communication service applications, which communicate with packet mode communication service application(s) in a mobile station MS over the IP connections provided by the radio network. The CPS is responsible for control plane management of communications. Embedded user-plane signaling is used for connecting call parties for a packet mode speech two-party (one-to-one) communication. Embedded signaling in the user-plane's bearer makes it unnecessary to reserve another bearer for the control plane's signaling, which saves network resources and allows to achieve a short connection setup time.

47 Claims, 4 Drawing Sheets

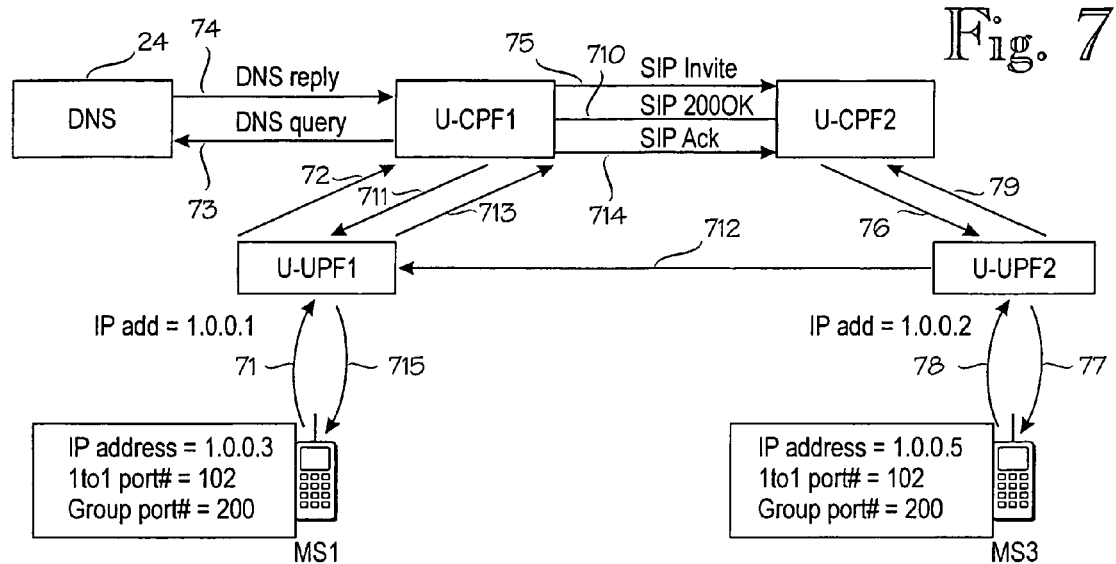

Fig. 8C
76

| Add Megaco termination |
|---|
| 1to1 call<br>From: sip:user_a@domain.net<br>To: sip:user_b@domain.net<br>SSRC = 2.1.1.4<br>U-UPF1's IP addr = 1.0.0.1 |

Fig. 8D
77

| Leading packet for 1to1 setup |
|---|
| Src. IP add = 1.0.0.2<br>Src. port# = 102<br>Dst. IP add = 1.0.0.5<br>Dst. port# = 102<br>SSRC = 2.1.1.4<br>Marker bit = 0<br>Payload type: 11 |
| From: sip:user_a@domain.net<br>To: sip:user_b@domain.net |

Fig. 8E
781

| Positive Ack |
|---|
| Src. IP add = 1.0.0.5<br>Src. port# = 102<br>Dst. IP add = 1.0.0.2<br>Dst. port# = 102<br>SSRC = 2.1.1.4<br>Marker bit = 0<br>Payload type: 21 |
| From: sip:user_a@domain.net<br>To: sip:user_b@domain.net |

Fig. 8F
711

| Add Megaco termination |
|---|
| 1to1 call<br>From: sip:user_a@domain.net<br>To: sip:user_b@domain.net<br>SSRC = 2.1.1.4<br>U-UPF2's IP addr = 1.0.0.2 |

Fig. 8G
712

| Positive Ack |
|---|
| Src. IP add = 1.0.0.2<br>Src. port# = 102<br>Dst. IP add = 1.0.0.1<br>Dst. port# = 102<br>SSRC = 2.1.1.4<br>Marker bit = 0<br>Payload type: 21 |
| From: sip:user_a@domain.net<br>To: sip:user_b@domain.net |

Fig. 8H
715

| Positive Ack |
|---|
| Src. IP add = 1.0.0.1<br>Src. port# = 102<br>Dst. IP add = 1.0.0.3<br>Dst. port# = 102<br>SSRC = 2.1.1.4<br>Marker bit = 0<br>Payload type: 21 |
| From: sip:user_a@domain.net<br>To: sip:user_b@domain.net |

ONE-TO-ONE COMMUNICATION

This application is a continuation-in-part of U.S. application Ser. No. 09/835,867, which was filed on Apr. 17, 2001, said application being incorporated in its entirety by reference.

FIELD OF THE INVENTION

The invention relates to communications systems, and especially to one-to-one (two-party) communication in communications systems.

BACKGROUND OF THE INVENTION

The most common call type is a call established between two parties for one-to-one communication. The standard way to set up a two-party call requires explicit control plane's signaling that allows the call parties to establish a channel where the audio data can be transferred and to negotiate the communication capabilities, for example the audio codec and the relative compression rate can be determined in this phase. Afterwards the actual voice communication can start and the audio data can be transmitted by the call parties.

Voice over Internet Protocol (VoIP) enables a speech communication over an IP connection. The Session Initiation Protocol (SIP, RFC2543), the standard protocol used for call establishment in "VoIP" based communication systems, requires some amount of signaling for each SIP session setup. In particular for two-party call an end-to-end "three round" INVITE transaction (by which a SIP session is initiated) has to be performed. The INVITE request asks the called party to join a particular two-party conversation. After the called party has agreed to participate in the call (by 200OK message), the caller confirms that it has received that response by sending an ACK request. The INVITE request typically contains a session description, for example written in Session Description Protocol (SDP, RFC2327) format that provides the called party with enough information to join the session. The session description normally enumerates the media types and formats that the caller is willing to use and where he wishes the media data to be sent. If the called party wishes to accept the call, he responds to the invitation by returning a similar description. Further, the control plane's signaling (which information cannot be lost during its transmission) and the user-plane's audio data (which may accept some loss but has real time characteristics) have different transport level requirements, which normally entail the transmission of the IP packets containing their corresponding data on separate bearers.

In some communication systems it is more important to have a fast call setup than to support end-to-end negotiation between the call parties which could even not be required at all if the audio codec and the relative parameters were fixed. Considering in particular a VoIP based environment this would mean that time consuming SIP signaling should be minimized in order to obtain fast call setup.

A mobile communications system refers generally to any telecommunications system, which enables communication when users are moving within the service area of the system. A typical mobile communications system is a Public Land Mobile Network (PLMN). Often the mobile communications network is an access network providing a user with wireless access to external networks, hosts, or services offered by specific service providers.

Professional mobile radio or private mobile radio (PMR) systems are dedicated radio systems developed primarily for professional and governmental users, such as the police, military forces, oil plants, etc. PMR services have been offered via dedicated PMR networks built with dedicated PMR technologies. This market is divided between several technologies analog, digital, conventional and trunked—none of which has a dominating role. TETRA (Terrestrial Trunked Radio) is a standard defined by ETSI (European Telecommunications Standards Institute) for digital PMR systems. U.S. Pat. No. 6,141,347 discloses a wireless communications system which uses multicast addressing and decentralized processing in group calls.

One special feature offered by the PMR systems is group communication. The term "group", as used herein, refers to any logical group of three or more users intended to participate in the same group communication, e.g. call. Group communication with a push-to-talk feature is one of the essential features of any PMR network overcoming this problem. Generally, in group voice communication with a "push-to-talk, release-to-listen" feature, a group call is based on the use of a pressel (PTT, push-to-talk switch) in a telephone as a switch: by pressing a PTT the user indicates his desire to speak, and the user equipment sends a service request to the network. The network either rejects the request or allocates the requested resources on the basis of predetermined criteria, such as the availability of resources, priority of the requesting user, etc. At the same time, a connection is established also to all other active users in the specific subscriber group. After the voice connection has been established, the requesting user can talk and the other users listen on the channel. When the user releases the PTT, the user equipment signals a release message to the network, and the resources are released. Thus, the resources are reserved only for the actual speech transaction or speech item. One interesting advantage of the push-to-talk communication is a short call setup time, which makes the push-to-talk type of speech calls attractive to several other types of users, too.

SUMMARY OF THE INVENTION

An object of the invention is to provide a new way to provide and manage two-party voice communication.

This object of the invention is achieved by methods, systems and terminals as defined in the attached independent claims. Preferred embodiments of the invention are defined in the attached dependent claims.

In the present invention embedded (i.e. implicit) signaling in a user-plane's channel is used for connecting call parties for a packet mode speech two-party (one-to-one) communication. Embedded signaling in the user-plane's bearer makes it unnecessary to reserve another bearer for the control plane's signaling, which saves network resources and allows to achieve a short connection setup time.

In an embodiment of the invention, the embedded signaling for establishing a one-to-one voice communication in a communications system comprises starting a communication by sending a leader packet from a calling party user to a communication unit the calling party has a packet-mode communication association with. Each leader packet contains identifier of the calling party and the called party. In one embodiment of the invention the communication unit forwards the leader packet and subsequent voice packets to a called party on the basis of the identifier of the called party. In another embodiment, wherein the called party and the calling party have dedicated user-plane communication servers, the leader packet is terminated at the user-plane server function of the calling party, which initiates programming of the communication server of the called party to support the call. Once the user-plane communication server of the called party has been programmed by the control plane to support the call, it generates a new leader packet, including a call identifier value assigned to the call, and sends it to the called party.

In further embodiments of the invention, minimal negotiation between the call parties is supported by using the embedded signaling. In an embodiment of the invention, the communication server will send an acknowledgement packet to the caller indicating that network entities are ready for forwarding audio packet stream between call parties. The calling party may react to such acknowledgement packet by starting to send following audio packets. In order to recover from possible packet loss during transmission, the leader packet or any other RTP packet containing embedded signaling will be periodically re-sent for a certain number of times (or until a relative acknowledgment is received.

In a further embodiment of the invention, the called party sends a positive acknowledgement packet to a communication server in response to receiving a leader packet. If the communication server does not receive such a positive acknowledgement packet from the called party within a preset timeout, it considers the called party unreachable and sends a negative acknowledge packet to the calling party.

In a further embodiment of the invention, the leader packet may also contain a description of the communication capabilities the calling party wishes to use during the communication. If the terminal of the called party, upon receiving the leader packet, observes that it does not support the communication capabilities according to the description, the called party sends a negative acknowledgement packet. This negative acknowledgement packet will be routed to the calling party and it may include a description of the communication capabilities the called party wishes to use in a one-to-one call.

BRIEF DESCRIPTION OF THE DRAWINGS

In the following, the invention will be described in greater detail by means of preferred embodiments with reference to the accompanying drawings, in which

FIG. 7 is a signaling diagram illustrating signaling and communication relating to the setup of one-to-one communication according to a second embodiment of the invention; and FIGS. 8A, 8B, 8C, 8D, 8E, 8F, 8G, and 8H illustrate packets and messages shown in FIG. 7.

PREFERRED EMBODIMENTS OF THE INVENTION

The present invention is applicable to any digital communications systems allowing packet mode communication between end users and a packet mode communication service. The invention is especially useful in mobile packet radio communications systems. In the following, the preferred embodiments of the invention will be described by means of a GPRS type packet radio service and the UMTS or GSM system without limiting the invention to this particular packet radio system. The IP voice communication method used in the preferred embodiments of the invention is the Voice over IP (VoIP), but the invention is not limited to this particular method.

Figure 1:
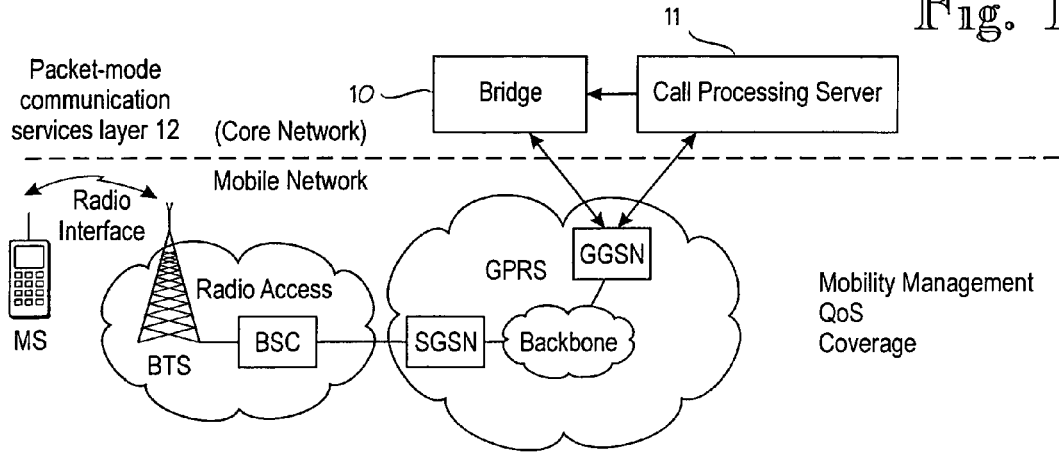
FIGS. 1 and 2 illustrate the basic architecture of the invention.

FIG. 1 illustrates the basic architecture of the preferred embodiment of the invention. In the illustrated embodiment, a mobile radio access network (RAN) which provides the IP packet data service is based on a GPRS architecture utilizing a 2G radio access technology, such as a GSM base station system BSS with base stations BTS and base station controllers BSC. The GSM radio access may be conventional or based on the GSM EDGE technique. In the latter case, radio access may be referred to as GERAN, which is an all-IP GSM radio access network. Alternatively, a 3G-radio access network UTRAN (such as UMTS) may be used. An all-IP core network can be used both in GERAN and UTRAN. The architecture of the mobile network is not essential to the invention, but the GPRS infrastructure and operation will be briefly discussed in order to make it easier to comprehend the invention. The GPRS infrastructure comprises support nodes, such as a GPRS gateway support node (GGSN) and a GPRS serving support node (SGSN). The main functions of the SGSN are to detect new GPRS mobile stations in its service area, handle the process of registering new mobile stations MS (also called User Equipment, UE) along with the GPRS registers, send/receive data packets to/from the MS, and keep a record of the location of the MSs inside of its service area. The subscription information is stored in a GPRS (HLR Home location register or HSS, Home Subscriber Server). The main functions of the GGSN nodes involve interaction with external data networks. The GGSN may also be connected directly to a private corporate network or a host. The GGSN includes PDP addresses and routing information, i.e. SGSN addresses for active GPRS subscribers. The GGSN updates the location directory using routing information supplied by the SGSNs. The GGSN uses the routing information for tunneling the protocol data units PDU from external networks to the current location of the MS, i.e. to the serving SGSN, in accordance with the GPRS tunneling protocol (GTP). Tunneling means that the data packet is encapsulated into another data packet during transfer from one end of the tunnel to another. The GGSN also decapsulates data packets received from MSs and forwards them to the appropriate data network. In order to send and receive GPRS data, the MS activates the packet data address that it wants to use, by requesting a PDP activation procedure. This operation makes the MS known in the corresponding GGSN, and interworking with external data networks can commence. More particularly, one or more PDP contexts are created and stored in the MS and the GGSN and the SGSN. The PDP context defines different data transmission parameters, such as PDP type (e.g. X.25 or IP), PDP address (e.g. IP address) and quality of service QoS.

Similarly, any communication network supporting a packet mode voice communication can be employed instead of the mobile network described above. The type of the underlying network layer (i.e. "the access network") is not essential to the basic invention.

More generally, the invention can be embodied within a server based core network (CN) with different control and user-plane's logical entities serving the subscribers connected to it. The subscribers' transmissions are proxied and forwarded by these CN entities, which do not allow direct end-to-end transmissions between the subscribers. It should be appreciated that call processing servers (CPS) and user-plane functions (Bridge) may also be within the access communication network, providing a top protocol layer for the access network.

In FIG. 1, a packet mode voice communication layer 12 (or a core network CN) is provided on top of the mobile network in order to provide communication services to the mobile stations MS through the mobile network. Conceptually, the packet mode voice communication layer 12 comprises a pair of basic logical entities, a bridge 10 and a call processing server (CPS) 11. The bridge 10 and the CPS 11 are connected to the GGSN, typically over an IP network. The bridge 10 and the CPS server 11 run packet mode voice communication applications, which communicate with the packet mode voice communication application(s) in the mobile station MS over the IP connections provided by the IP mobile RAN. This communication includes both signaling packets and voice communication packets.

The CPS 11 is responsible for control-plane management of the packet mode voice communications. Its important role may require various functionalities, managing the user activity and creation and deletion of logical user-plane connections with an appropriate control protocol, such as SIP, and management of the user profiles (call rights, etc.); user location and routing functionalities of SIP signaling; user registration/authentication; and control of the network entities involved in the IP layer data distribution according to the user specific information. However, in this description, the common term CPS refers to all possible functionalities of the CPS.

Figure 2:
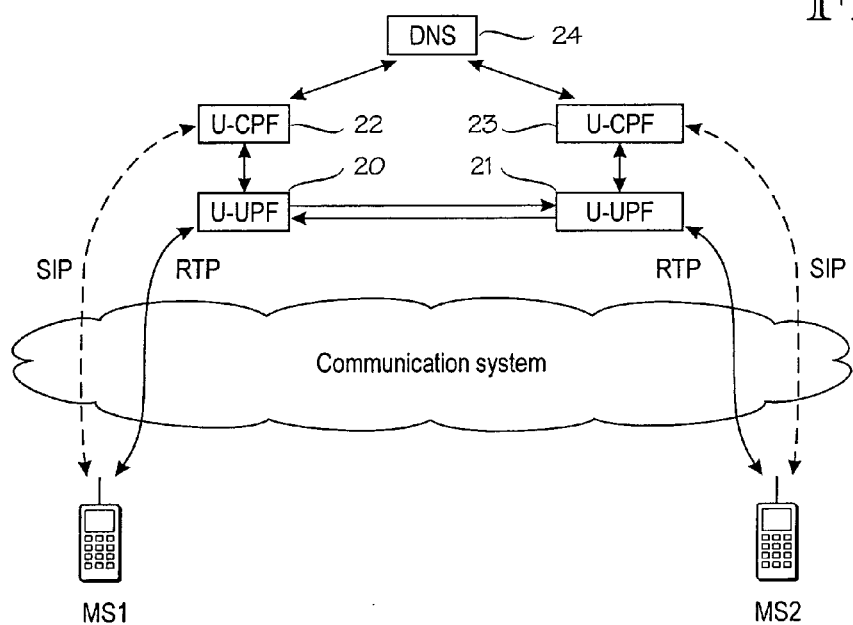

Referring to FIG. 2, the CPS 11 includes for each active user a dedicated User-Control Plane Function (U-CPF) (e.g. a control plane proxy server) which is basically the control plane interface between the IP network and the user. By this network entity the users log on to the system and negotiate their operational settings (call rights, etc.). It handles the user's profile and manages his one-to-one calls.

Referring again to FIG. 1, the bridge 10 is responsible for the real-time distribution of VoIP packets to the users' terminals. Each bridge forwards traffic only between valid connections programmed by the CPS. The bridge 10 may perform one or more of the following functionalities:

Input checking: to identify and authenticate the traffic source (optionally the mnemonics in the leader RTP packet, which will be discussed below, have to be processed here). Input checking may also include actions to perform and support security procedures.

Scanning filtering: to select from the multiple incoming traffic streams destined to the same user the one which has to be forwarded to his recipient according to the user's scanning settings.

Referring to FIG. 2, the bridge 10 includes for each active user a dedicated User-User-plane Function (U-UPF) (e.g. in a server) which performs the input checking and scanning processes for the individual subscribers which have been assigned to it by the U-CPF. For security purposes the U-UPF may have security associations for each mobile terminal it handles. The U-UPF hides the network complexity from the mobile terminals, so the user just has to send all his user-plane traffic to this unit that afterwards forwards it according to the mapping settings made by the U-CPF. In this way there is no need to establish secure channels between each user and all the IP network entities, which just have to trust the U-UPF from which they receive packets. In FIG. 2, a mobile station MS1 has dedicated U-UPF 20 and U-CPF 22, and a mobile station MS2 has dedicated U-UPF 21 and U-CPF 23.

The U-CPFs 22 and 23, which are responsible for managing the sessions of the users, require specific control plane signaling. ETSI 3GPP (European Telecommunications Standards Institute, 3rd Generation Partnership Project) specifications include IP based voice communications in a so-called all-IP network. Such an all-IP network enables also voice communication in IP network (voice over IP, VoIP). For VoIP, call control signaling is specified, such as the Session Initiation Protocol (SIP), which is defined in the RFC2543.

However, some other IP session protocol could be used instead. Further, in the preferred embodiment of the invention, Megaco (defined in RFC28859) is used by the U-CPFs 22 and 23 to control the U-UPFs 20 and 21 involved in traffic distribution of the IP layer. However, some other corresponding protocol for controlling the switching of the user-plane elements may be used instead. Still further, the RTP (Real Time transport Protocol) protocol has been chosen to handle the transfer in the preferred embodiment, and QoS mechanisms are needed to handle the voice packet (VoIP) delivery.

The Real-Time Transport Protocol (RTP) developed by the IETF to support the transport of real-time streams for audio communications over packet networks is used on top of the UDP in order to avoid the delays introduced by more reliable transport protocols (not required in this context), such as the TCP. With the RTP and latency buffering at the receiving endpoint, the timing (jitter problem), packet ordering, synchronization of multiple streams, duplicate packet elimination and continuity of the streams can be handled.

Megaco defines a general framework for physically decomposed multimedia gateway. Its connection model is based on two main abstractions, which are Termination and Context. The former is a logical entity in the MGW (i.e. Bridge) that sources and/or sinks one or more streams, while the latter is an association between a collection of Terminations that describes the topology (who hears/sees whom) and the media mixing and/or switching parameters if more than two Terminations are involved in the same association. Priority values can be used by the MGC (i.e. CPS) in order to provide the MGW with information about a certain precedence handling for a context, and an indicator for an emergency call is also provided to allow a preference handling. The protocol provides commands for manipulating the logical entities of its connection model, contexts and terminations, and it is here assumed that it provides the flexibility and the functionalities required by the CPS 11 (the U-CPFs 22 and 23) to program the proper traffic paths and filtering processes in the Bridge 10 (the U-UPFs 20 and 21).

The SIP protocol defines signaling messages for call control, user location and registration, and these have been used in the preferred embodiment to handle the specific voice communications and the relative participating users (establishment, joining and tear down of a call session, user's log on to the services, user's profile negotiation, etc).

During the user registration, in case the user is allowed to have 1-to-1 communications, some user-plane's parameters are included in the SIP REGISTER message and the U-CPF uses them to establish an always-open RTP channel between the user's terminal and the U-UPF (assigned to him) to be used for the user's 1-to-1 calls. All the user's outgoing and incoming traffic has to go through the U-UPF 20/21 that has been assigned to the user by his U-CPF 22/23. In particular, in the uplink the user's traffic is checked by his U-UPF 20/21 and forwarded to the U-UPF 21/20 handling the called party. The U-UPF 21/20 of the called party then performs the scanning process and delivers the traffic to the recipient.

The packet mode voice communication service is access independent, which means that it can run on top of GSM, WCDMA, WLAN or equivalent technologies as long as these are able to support the always-on VoIP bearers. The IP layer's audio distribution uses standard VoIP mechanisms (such as the RTP), while specific Internet protocols or interfaces will be used to connect supplementary network entities, such as a domain name server (DNS) 24. Each network entity is obviously associated with at least one IP address by which the IP packets are transferred and routed, but the role of the network elements have also to be defined from the SIP's point of view. Each MS is a SIP User Agent (UA), and thus each one needs a SIP address which normally is "user-name@domain(host?)-name" where the host name is associated with the U-CPF 22/23 in which the MSs have to register. This UCPF 22/23 should act as a Registrar, Location and Proxy SIP server in order to allow the reachability of the MSs under his control and to support the SIP signaling routing. The U-UPFs 20/21, which are exclusively involved in the audio data distribution, do not have a role in the actual SIP mechanisms and the core network is simply seen as a single IP network link. At the SIP signaling level, URLs are used for user and group identification. The URLs can be sip: URLs as defined in the RFC2543, tel: URLs representing telephone numbers as defined in the RFC 2806, or any other URL formats. The REGISTER method is used with a sip: URL. Dialing of users with a private numbering plan number (only) is possible using the tel: URL in the To: header field (sip: URL must have the host portion present at all times). This could be used for example for addressing the b-party for one-to-one calls if the b-party is from the same virtual private network (VPN). The addressing on the user-plane will be explained in more detail below.

The user equipment, or mobile station MS, has a packet mode voice communication application on a user layer on top of the standard protocol stack used in the specific mobile communications system. The SIP and RTP protocols employ the underlying TCP, UDP and IP protocols, which further employ the physical layer resources, such as the radio resources. It is assumed that at least in the users' terminals the IPv6 is implemented, while in some core network entities it could be required to support the IPv4 also (dual IPv6/v4 stack) in order to assure the interoperability with eventual sub-networks still using it. The MS, when the packet mode voice communication mode is selected by the user sets up two GPRS contexts: a) one to be used for control plane signaling (SIP/UDP/IP), b) one for real-time audio streams (RTP/UDP/IP) with conversational IP quality class or similar, and sufficient header compression over the radio path. The RTP/UDP/IP protocol stack is commonly used in the VoIP world for real-time audio data transmission, and thus it is selected for the user-plane in the preferred embodiment of the invention as well. If a mobile or the mobile network does not support two simultaneous contexts, the mobile must clear down the RTP connection for the duration of the SIP signaling transaction. The MS must always maintain the contexts to the bridge 10 when the packet mode voice communication mode is on. The SIP context is also preferably on all the time, but if this causes problems to network capacity, the SIP context can be set up also for the duration of signaling transactions. In this case the cellular network must support the network-initiated context set up. The SIP sessions are signaled in power on or in packet mode voice communication mode activation. The SIP sessions are always on and thus no SIP signaling is needed for packet-mode voice items. All voice is transmitted after PTT activation via the existing contexts. This mechanism enables fast call set up.

The architecture according to the invention enables the users to make direct one-to-one calls to other users within their defined access rights. A direct one-to-one call resembles the use of an intercom rather than the use of a normal telephone. Such calls are well suited to many PMR users: tasks, commands and advice can be given and received with minimal attention to operating the mobile station. Activities can be coordinated with good timing accuracy without having to keep a call on during long periods.

When a call party has a logical connection, the actual communication path, including the channel resources at the sending and receiving ends, needs to be opened and the resources to be reserved only for the duration of the talk item. Call set-up signaling, authentication, agreement of encryption keys and negotiation of service parameters are not needed in the resource reservation phase, because the logical connections already exist, but the physical resources are reserved and opened by using the signaling procedures. Thus, short connection set up times can be achieved. In an embodiment which uses VoIP based communication, the inventive concept means that embedded signaling in the Real-time Transport Protocol (RTP) packets would be enough without time consuming SIP signaling. Specific RTP packets with relative payload types are defined. In these special purpose packets, the content of payloads and/or the values in the "payload type" field in the RTP header are used as embedded signaling. More generally, the same type of embedded signaling can also be applied to other type of real time voice packets in the IP or another protocol environment.

Figure 3:
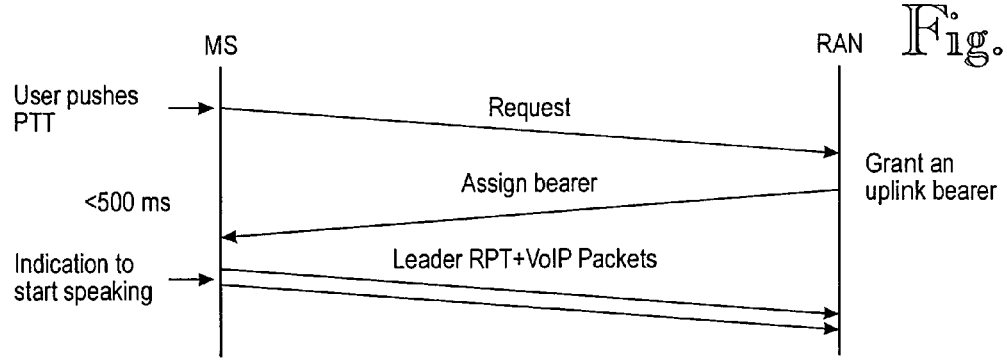
FIGS. 3 and 4 are signaling diagrams illustrating the allocation of uplink and downlink bearers, respectively, in the radio interface of a mobile network.

The allocation of the uplink bearer at the radio interface of the mobile RAN is illustrated in FIG. 3. Once the 1-to-1 call has been established, the user pushes the PTT and the MS sends a speech item request to the mobile RAN. The MS will ask for a dedicated radio bearer for the duration of whole speech item. The mobile RAN grants the uplink bearer (e.g. a dedicated packet data channel and the physical time slot). When the mobile RAN acknowledges allocation of the uplink bearer, the mobile starts sending data through it. The first packet sent is an RTP message containing the talking party mnemonic identifier followed by voice stream packets (VoIP packets). The leader RTP packet and the VoIP packets are routed to the U-UPF of the user on the basis of the active GPRS context.

Figure 4:
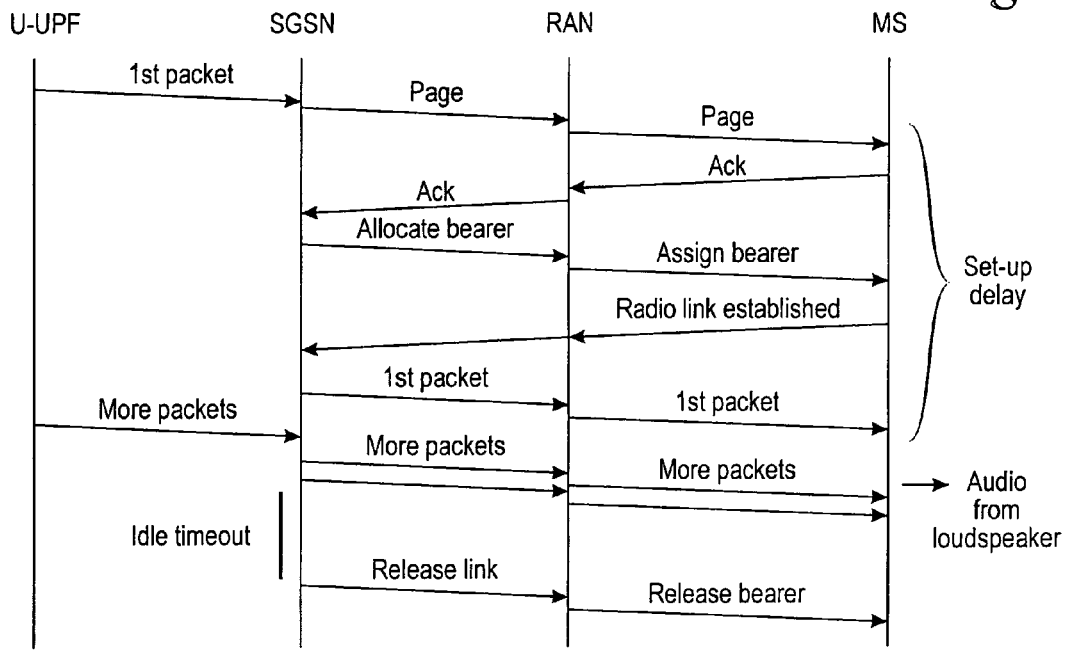

The U-UPF of the calling party sends packets to the U-UPF of the called party. The allocation of the downlink bearer in the radio interface of the mobile network is illustrated in FIG. 4. The downlink bearer is allocated by the SGSN when it detects an IP packet going via an existing context to a mobile station MS. Firstly, the SGSN pages the MS if it is in a STANDBY state. After receiving an acknowledgement from the MS, the SGSN requests that the RAN (e.g. the GSM BSS) allocates a dedicated radio bearer, and after the allocation the SGSN starts sending packets (e.g. in LLC frames) to the RAN. The RAN sends the packets (e.g. in radio blocks) to the MS.

The uplink voice bearer is released by the MS when the user stops pushing the PTT switch. The network will release the uplink bearer when the maximum speech item length (e.g. 20 to 30 sec) is exceeded. In the downlink direction the radio network should release the bearer when no IP messages associated with the bearer have been received for a predetermined period of time (so called idle timeout).

In the following, the preferred embodiments and different aspects of the invention are discussed on the control plane and the user-plane of the packet-mode voice communication service.

User Log on to Packet-mode Voice Communication Services

Before the user can start to use the packet-mode voice services he has to register himself with his U-CPF 22/23 whose address has to be determined by DNS services. In the preferred embodiment of the invention the user first makes a DNS query containing the domain part of his SIP address. The DNS 24 returns the IP address of the U-CPF 22/23 corresponding to the domain part.

Figure 5:
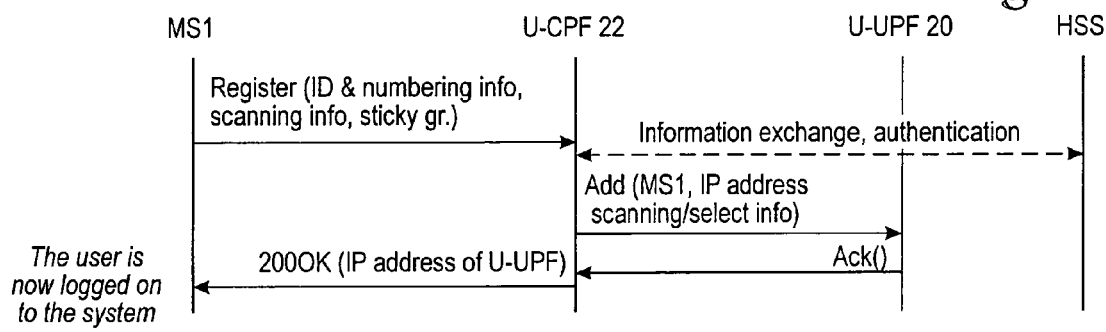
FIG. 5 is a signaling diagram illustrating user log-on to packet-mode voice communication services.

Referring to FIG. 5, once the MS1 knows the IP address of the U-CPF 22, it sends a SIP registration message to the U-CPF 22. When the U-CPF 22 receives the registration message from the user's MS, it has to select and assign a U-UPF 20 to the user where his input checking and scanning filtering process has to be performed and where the user has to send his user-plane traffic. The user is then added to the selected U-UPF 20 by an MEGACO Add message, and the U-UPF 20 initializes the user's scanning process and sends an acknowledgement. Optionally, before selecting the U-UPF 20, the U-CPF 22 may exchange user information with the HLR/HSS of the user, authenticate the user and create a user profile.

During the first registration the user gets the IP address of his U-UPF 20, and using the static port number pre-assigned for 1-to-1 communications he can start to request 1-to-1 call establishments The registration message normally includes the identification information of the user, but the message can also include other relevant indications and it can be re-sent several times by the user in order to update his profile or to request particular information to his U-CPF 22.

In order to avoid the log-on of different users to the system by the same terminal, which would require more than one scanning processes for the same IP recipient, a specific checking mechanism may be performed by the U-CPF 22.

One-to-One Call Management

EXAMPLE 1

Figure 6:
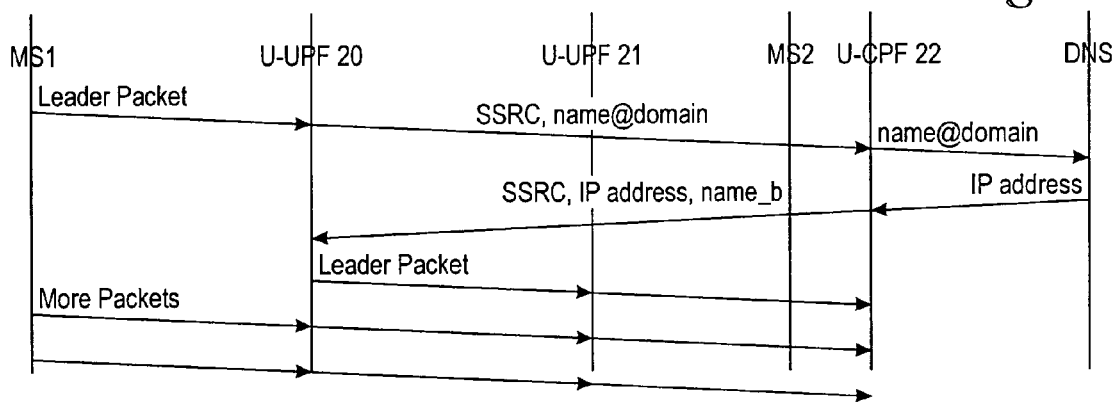
FIG. 6 is a signaling diagram illustrating signaling and communication relating to the setup of one-to-one communication according to a first embodiment of the invention.

A first example of one-to-one call management is now described with reference to FIG. 6. A static port number is allocated each U-UPF 20 for one-to-one traffic.

If a user wants to establish a one-to-one communication, he pushes the PTT in his terminal MS1 and the uplink resources are reserved as described above. Then a call should be established and routed to the called party MS2. The straightforward way to support this functionality would be to use SIP signaling, but in order to avoid the delay introduced by the explicit signaling transactions an alternative solution that uses the payload type field of the RTP packet for implicit signaling according to the invention is used. With this implicit signaling approach each user can try to speak to the selected recipient whenever he wants.

To this end, after the radio resources have been reserved, the MS1 sends a leader packet containing his and the callee's identity information (number or name) to his U-UPF 20 using the specific "one-to-one" port number (e.g. 102) and a special payload type number (defined for this special purpose). In addition to the identity of the called party (MS2), the leader packet may contain other relevant information. This other information may include a description on the communication capabilities the calling party wishes to use during the call. The leader RTP packet is followed by the actual audio stream (RTP traffic, VoIP packets).

In order to recover from the situation where the leading RTP packet might be lost during its transmission to the U-UPF 20, the MS1 may resend this packet periodically until a positive acknowledgement packet ("Call Setup ACK") identified by a specific payload type is sent by the U-UPF 20 telling that the entities involved with the call have been properly programmed for routing the following audio packet streams. This packet preferably also contains a unique SSRC value generated by the U-UPF 20 or U-CPF 22 to identify the subsequent audio packets, which belong to the call. The call parties MS1 and MS2 will use this value in their following call related RTP packets to allow the U-UPFs to recognize and correctly forward them to the receiving party. After receiving the "Call Setup ACK", the caller can start to speak and the MS1 sends RTP audio packets.

When the leader RTP packet for 1-to-1 call setup request is received, the U-UPF 20 makes a location query to the U-CPF 22 so as to determine the path the leading RTP packet has to be forwarded to in order to reach the terminal MS2 of the called party. More specifically, because the calling user's U-UPF 20 cannot convert the identity of the called party MS2 into an IP address, the MS1's U-UPF 20 forwards the identity (e.g. name@domain), using a suitable control protocol, to the caller's U-CPF 22, which then carries out a name query (either from an integrated name server or from a separate DNS). The MS1's U-CPF 22 also checks that the called party MS2 has logged on to the packet-mode voice communication service, and that the call rights settings permit the call between the two parties. Finally, the MS1's U-CPF 22 determines the user-friendly form of the calling party identity to be shown to the called party (name_b). The returned IP address and name_b are then sent by the MS1's U-CPF to the MS1's U-UPF. The MS1's U-UPF now modifies the leader packet to contain name_b for forwarding to the called party MS2.

When the called party MS2 receives the first leading RTP packet, it sends a positive ACK packet ("Receiving ACK") identified by a specific payload type to its U-UPF 21. It is not necessary to forward this packet to the MS1 because the caller does not have to wait for it before he can start to speak (he can start immediately after the reception of the "Call Setup ACK" from his U-UPF 20), but obviously the caller must be alerted in case the leading RTP packet does not reach the MS2 of the called party and for this purpose, if the U-UPF 21 does not receive the "Receiving ACK" packet within a certain timeout, the U-UPF 21 it considers the called party unreachable and sends a negative ACK RTP packet (identified by specific payload type) to the calling party MS1.

Eventually this negative ACK packet may be even originated by the MS2 itself in case the MS2 does not support the communication capabilities proposed by the MS1 for the call (like codec, modes, etc), and the MS2 preferably includes a description of how the MS2 wishes to send/receive the audio packets. This packet releases the call, but allows the caller to establish a new one, which is supported by the callee.

After receiving "Call Setup ACK", the calling party is talking and the terminal MS1 sending RTP packets containing voice to his U-UPF 20, which based on the SSRC field in the packet will find out the IP address of the called party's (MS2) U-UPF 21 to which it will forward the voice packets. Afterwards the called party's U-UPF 21 will eventually deliver them (depending on the scanning process results) to the called party's terminal MS2. The audio streams for each talk spurt are leaded by a special RTP packet, identified by a specific payload type number (at this purpose defined), which allows to implement specific mechanism in the U-UPF to support semi-duplex communication.

The calling party ends the communication by releasing the PTT. The MS1 may now send a trailer packet in order to indicate the stop of the communication to the U-UPF. It is also possible to employ a continuity monitoring wherein a timer is set in response to receiving a packet. If no packet is received within a preset timeout, the communication is considered to be ended.

Let us now consider examples of some special signaling cases, which may occur in one-to-one communication.

The called party may receive more than one one-to-one call to the same called party at the same time. Therefore, the called party's U-UPF 21 will detect if there is a one-to-one voice transfer ongoing to an MS, and prevent any simultaneous one-to-one streams to the same MS. This is preferably handled so that the incoming traffic in the one-to-one port is filtered according to the recognized SSRCs.

The call set up delay experienced by the caller after pressing the PTT switch may be shortened by the mobile station MS giving an audible indication to the user to start speaking. After the audible tone, the user can start speaking and the VoIP message starts. This is the time the caller experiences as the set up delay. There are several points at which the permission to speak can be given. One suitable point is after the uplink radio bearer has been allocated and after the first RTP message (so called Leader packet, non-voice) has been sent to the RAN. Notice that the downlink status is not known at this point. In case of call failure because of missing B party or missing radio bearers in the downlink direction or a failure of a call authorization check, the user gets an indication of a call failure. The indication to speak could be alternatively given after the U-UPF gives an acknowledgement (such as the "Call setup ACK" described above) of, for example, having processed the first RTP packet or even of the B party having acknowledged the header packet. Still alternatively, the MS could have a timer value from sending the lead packet to giving the audible indication to the user.

The person who initiates a one-to-one call expects that his voice is transported to the called party and that the called user will hear his voice. If, for any reason, this is not possible, the talking user will be notified as soon as possible. Non-delivery can depend on many different reasons. Some of the reasons can be detected by the caller U-UPF, which can then inform the talking party. An example of this is that the voice packets cannot be delivered because the scanning process is forwarding higher priority traffic. Some cases can be detected by the caller U-CPF during the leader packet processing. Examples of this include that 1) the called party is unknown, 2) the called party is not currently logged on to the system, and 3) call rights check indicates that one-to-one calls between the parties are not allowed. The remaining cases are more difficult. For instance, the called party may be unable to receive the packets because of being engaged in a circuit mode call. It is proposed that this is solved such that when an MS begins to receive one-to-one traffic, it will send some packets back to the caller U-UPF. A failure in this will be detected by the U-UPF, which will then notify the calling party. To ensure that the communicating parties experience a sense of mutual, two-way communication, the bridge will implement timers to ensure that a) a speech item that has been allowed to start (packets are being forwarded) is not interrupted by any traffic (except when overridden by higher priority traffic), and b) a conversation is not interrupted between short breaks (of the order of some seconds) between the speech items.

One-to-One Call Management

EXAMPLE 2

Another example of one-to-one call management is now described with reference to FIGS. 7 and 8A–8H.

In FIG. 7 the mobile terminal MS1 has an IP address 1.0.0.3, and the mobile terminal MS3 has an IP address 1.0.0.5. In both terminals, UDP port 102 is reserved for one-to-one communication and, optionally, UDP port 200 is reserved for a group communication. Let us assume that user of the mobile terminal MS1 wants to start a one-to-one communication to the mobile terminal MS3. The user of the terminal MS1, i.e. the calling party, pushes the PTT and the uplink resources are reserved as described above.

Then the calling party MS1 sends a leading packet 71 for one-to-one communication setup. The format of the leading packet 71 may be as illustrated in FIG. 8A. The leading packet 71 includes a source IP address (Src.IP add.) 1.0.0.3 (the address of the MS1); source port number (Src.port#) 102 (the one-to-one communication port); a destination IP address (Dst.IP add.) 1.0.0.1 (the address of U-UPF1); a destination port number (Dst.port#) 102; a random SSRC; Marker bit 0; and Payload Type 11 (which indicates that the packet 71 is a leading RTP packet for one-to-one call setup). The leading packet 71 further includes the SIP URLs of the calling party (sip:user_a@domain.net) and the called party (sip:user_b@domain.net).

The leading packet 71 is routed to the U-UPF1 on the basis of the destination address 1.0.0.1. The U-UPF1 analyzes the content of the leading packet and, upon observing that a one-to-one communication setup is requested, sends an Event notification 72 (Megaco message) to the U-CPF1. The format of the Event notification 72 may be as illustrated in FIG. 8B. It indicates a one-to-one call, and includes the identifications (SIP URLs) of the calling party MS1 and the called party MS3.

U-CPF1 makes a DNS query 73 to the domain name server DNS 24 in order to get the address of the U-CPF2 of the called party MS3 on the basis of the domain name of the called party. The address is returned in the DNS reply 74.

Then the U-CPF1 sends a SIP INVITE message 75 to the UCPF2. The SIP INVITE message 75 includes at least the SIP URLs of the caller and callee as well as the SSRC value assigned to the call by the UCPF1 (or U-UPF1).

The U-CPF2 programs the U-UPF2 of the called party MS3 by sending an Add Megaco termination message 76. The format of the message 76 may be as illustrated in FIG. 8C. Message 76 indicates that a one-to-one call has to be set up, and includes the identifications of the caller and callee, the SSRC value (2.1.1.4) assigned to the call, and the IP address (1.0.0.1) of the U-UPF1.

Once the U-UPF2 is programmed to support the call, it sends a reply message 79 to the U-CPF2 and generates the new leading RTP packet 77, which is sent to the called party MS3. The format of the leading RTP packet may be as illustrated in FIG. 8D. It contains the source IP address 1.0.0.2 (the address of U-UPF2); the source port number 102 (the one-to-one communication port); the destination IP address 1.0.0.5 (the address of the MS3); the destination port number 102 (one-to-one port); the SSRC value 2.1.1.4 assigned to the call; Marker bit 0; and Payload Type 11 (which indicates that the packet is a leading RTP packet for one-to-one request). The leading packet 77 further includes the identifications of the caller MS1 and the callee MS3.

The MS3 receives the leading packet 77 and if it accepts the call, it sends a positive ACK message 78 to the U-UPF2. The format of the positive ACK message 78 may be as illustrated in FIG. 8E. It contains the source IP address 1.0.0.5 (the address of MS3); the source port number 102 (the one-to-one port); the destination IP address 1.0.0.2 (the address of U-UPF2); the destination port number 102; the SSRC value of the call; the Market bit 0; and the Payload Type 21 (which indicates that RTP packet is a positive ACK packet).

The U-CPF2 sends a SIP 200 OK message 710 to the U-CPF1. The U-CPF1 sends a Add Megaco termination message 711 to the U-UPF1. The format of the message 711 may be as illustrated in FIG. 8F. The message indicates a one-to-one call, and contains the domain names of the caller MS1 and the callee MS3; the SSRC value 2.1.1.4 of the call; and the IP address 1.0.0.2 of the U-UPF2. The U-UPF1 acknowledges by a reply message 713, and the U-CPF1 sends a SIP ACK message 714 to the U-CPF2.

Thus, the U-UPF1 and the U-UPF2 have been programmed to support the call.

The Megaco REPLY reply message 713 or 79 is sent by each U-UPF to respective U-CPF2 immediately after it has been programmed by the respective U-CPF to complete the Megaco transaction. In order to reduce the call setup delay the SIP INVITE transaction is not synchronized with the positive ACK message sent by the called party. Because of the unpredictable duration of the SIP INVITE transaction it might happen that the callee sends his positive ACK message before the caller's U-UPF has been programmed, so he has to repeat it for a certain number.

The U-UPF2 forwards the positive ACK RTP packet 712 (sent by the callee) to the U-UPF1. The format of the packet 712 may be as illustrated in FIG. 8G. It contains the source IP address 1.0.0.2 (the address of the U-UPF2); source port number 102; destination IP address 1.0.0.1 (the address of U-UPF1); destination port number 102; the SSRC value 2.1.1.4 of the call; the Marker bit 0; and the Payload Type 21 (which indicates that the RTP packet is the positive ACK packet.

The U-UPF1 forwards the positive ACK packet 715 to the MS1. The format of the message 715 may be as illustrated in FIG. 8H. It contains the same information as the packet 712, except that the source IP address is 1.0.0.1 (the address of U-UPF1) and the destination IP address is 1.0.0.3 (the address of the MS1).

Upon receiving the positive ACK packet 715 the calling party MS1 is allowed to start sending RTP voice packet provided with the SSRC value of the call to the U-UPF1. On the basis of the SSRC value the U-UPF1 and the U-UPF2 route the RTP packets to the called party MS3.

Only the basic procedure for setting up a one-to-one communication is described for this embodiment. However, it should be appreciated that all the special embedded signaling cases described above with respect to example 1 can also be applied in this embodiment.

Scanning Filtering

In order to avoid the waste of bandwidth in the downlink for the transmission of traffic that will not be played out in the terminal, the filtering function obviously has to be implemented beforehand in the network, and this is one of the motivations for introducing the U-UPF into the network architecture according to the preferred embodiment.

The role of the U-UPF in this context is that the U-UPF has to decide which one of the several possible traffic streams addressed to a user actually needs to be forwarded to him. It is normally the traffic from the currently listened to group, but occasionally could be an overriding traffic stream.

In order to ensure conversation continuity (i.e. to ensure that a listener receives a coherent series of transmissions), a specific timer is provided in the U-UPF. The function of this timer is to keep the user receiving consecutive talk spurts in the same individual call unless there is a pause longer than a certain timeout in the conversation. Here we are talking about typical values between 2 and 15 seconds.

In principle this means that the scanning process will lock to the received call after each packet, for the duration of this timer.

The description only illustrates preferred embodiments of the invention. The invention is not, however, limited to these examples, but it may vary within the scope and spirit of the appended claims.

The invention claimed is:

1. A method for establishing a one-to-one voice communication in a communications system having different control plane and user-plane logical entities, comprising the steps of
    starting a one-to-one call by call setup signaling embedded in a user-plans traffic sent front a calling subscriber to one of said user-plane logical entities, said embedded signaling identifying a called subscriber,
    establishing, in response to said embedded call setup signaling, a logical call path between the ones of said user-plane logical entities which are to be involved in routing of the call related user-plane traffic,
    assigning a call identifier to said call, and
    forwarding any subsequent user-plane traffic relating said call and containing said call identifier over said call path from said calling subscriber to said called subscriber.

2. A method according to claim 1, wherein said step of establishing a logical call path comprises forwarding said user traffic with the embedded call setup signaling to said called subscriber and establishing a logical call path between the ones of said user-plane entities through which the embedded call setup signaling is routed.

3. A method according to claim 1, wherein said step of establishing a logical call path comprises initiating, in response to receiving said embedded call setup signaling from said calling subscriber, a control-plane procedure to program said user-plane entities which are to be involved in routing of the call related user-plane traffic, to support said call.

4. A method according to claim 3, wherein the one of said user-plane entities which serves the called party generates and sends a call setup signaling embedded in user-plane traffic and containing said assigned call identifier to said called party.

5. A method according to claim 1, comprising a step of forwarding any subsequent user-plane traffic relating said call over said call path from said called subscriber to said calling subscriber.

6. A method according to claim 1 or 2, wherein said user-plane traffic comprises real-time audio transport packets.

7. A method according to claim 6, wherein the embedded signaling comprises real-time audio transport packets having specific payload types.

8. A method for establishing a one-to-one voice communication in a communications system having different control plane and user-plane logical entities, said method comprising the steps of
- starting a packet-mode voice communication by sending a user-plane leader packet from a calling user to a first user-specific logical user-plane network entity serving said calling user, said leader packet containing identifier of said sending user and a receiving user,
- creating, in response to receiving said user-plane leader packet from said calling user, a logical user-plane channel between said first user-plane entity and a second user-specific logical user-plane network entity serving said called user,
- assigning a call identifier to said call,
- sending a user-plane leader packet from said second user-plane entity to said called user, said leader packet containing said call identifier,
- notifying said call identifier to the calling user by a user-plane communication,
- sending user-plane voice packets provided with said call identifier from said calling user to said first user-plane entity,
- forwarding said user-plane voice packets to said called user over said logical channel and via said second user-plane entity.

9. A method according to claim 8, wherein step of creating a logical user-plane channel comprises forwarding said user plane leader packet to said called subscriber and establishing a logical call path between said first and second user-plane entities via said second user-plane entity.

10. A method according to claim 9, wherein said step of forwarding said user-plane leader packet comprises the further steps of
- inquiring an IP address of second communication entity from a communication control server on the basis of said identity of said receiving user,
- routing said user-plane leader packet and subsequent voice packets to said IP address of said second communication entity.

11. A method according to claim 8, wherein said step of establishing a logical user-plane channel comprises initiating, in response to receiving said user-plane leader packet from said calling subscriber, a control-plane procedure to program first and second user-plane entities to support said call.

12. A method according to claim 11, wherein said second user-plane entity generates and sends a new user-plane leader packet containing said assigned call identifier to said called party.

13. A method according to claim 8, wherein said step of notifying comprises sending a user-plane call setup acknowledgement packet containing said call identifier from said first user-plane entity to said calling user.

14. A method according to claim 13, comprising starting transmission of said subsequent voice packets from said calling user in response to said user-plane call setup acknowledgement packet.

15. A method according to claim 8, comprising sending a user-plane reception acknowledgement packet from said called user to said second user-plane entity in response to receiving said user-plane leader packet from said second entity.

16. A method according to claim 15, comprising sending, in response to receiving said user-plane reception acknowledgement packet from said called user, a user-plane call setup acknowledgement packet from said second user-plane entity to said first user-plane entity, and sending a user-plane call setup acknowledgement packet from said first user-plane entity to said calling user in order to enable the calling user to send the subsequent user-plane voice packets.

17. A method according to claim 15, comprising considering said called user unreachable if said second user-plane entity does not receive a user-plane reception acknowledgement packet within a preset timeout, and notifying said calling user of said unreachability by a user-plane communication.

18. A method according to claim 8, wherein said user-plane leader packet comprises a description of communication capabilities said calling user wishes to use in said call.

19. A method according to claim 18, comprising sending a negative acknowledgement user-plane packet from said called user to said second user-plane entity if a terminal of said called user does not support said communication capabilities described in said leading packet.

20. A method according to claim 19, wherein said negative acknowledgement packet contains a description of the communication capabilities said called user wishes to use.

21. A method according to claim 8, wherein said user-plane packets are real-time audio transport packets, and wherein said leading packet is a real-time audio transport packet having a specific payload type.

22. A method according to claim 8, 14, 16 or 17, wherein said user-plane packets are real-time audio transport packets, and wherein said acknowledgement packet is a real-time audio transport packet having a specific payload type.

23. A method according to claim 11, wherein
- said initiating of said control-plane procedure comprises sending an event notification message from said first user-plane entity to a first user-specific control-plane entity serving said calling user, said notification message indicating that a one-to-one call is to be set up and containing said identifiers of said calling and called parties,
- said first control-plane entity determines, on the basis of said identity of said called user, a second user-specific control-plane entity serving said called user,
- said first control-plane entity instructs said second control-plane entity to define said second user-plane entity to support said call and to establish said user-plane logical channel,
- said first control-plane entity instructs said second control-plane entity to configure said second user-plane entity to support said call and to establish said user-plane logical channel,
- said first control-plane entity configures said first control-plane entity to support said call and to establish said user-plane logical channel.

24. A communications system, comprising
- logical control plane network entities,
- logical user-plane network entities,
- user terminals supporting packet-mode one-to-one voice communication,
- each of said user terminals having a one-to-one call setup mechanism sending call setup signaling embedded in a user-plane traffic to one of said user-plane logical entities, said embedded user-plane signaling identifying a called user terminal,
- a first mechanism establishing, in response to receiving said embedded user-plane call setup signaling, a logical call path between the ones of said user-plane entities which are to be involved with routing of user-plane traffic related to said call, and said logical user-plane entities having a second mechanism forwarding any subsequent user-plane traffic relating to said call over said call path from said calling subscriber to said called subscriber.

25. A system according to claim 24, wherein said user-plane traffic comprises real-time audio transport packets.

26. A system according to claim 25, wherein the embedded signaling comprises real-time audio transport packets having specific payload types.

27. A communications system, comprising
logical control plane network entities,
at least first and second user terminal supporting packet-mode one-to-one voice communication,
a dedicated user-specific logical user-plane network entity for each user terminal,
each user terminal having a one-to-one call setup mechanism sending a user-plane leader packet to a respective one of said first user-plane network entities in order to start a one-to-one voice call, said leader packet containing identifier of a calling user I and a called user,
means responsive to receiving said user-plane leader packet from said calling user for creating a logical user-plane channel between a user-plane network entity of a calling user terminal to a user-plane network entity of a called user terminal,
means for assigning a call identifier for said call,
means for notifying said call identifier to the calling user terminal,
means at said user-plane network entity of said called user for sending a user-plane leader packet from said user-plane network entity of said called user terminal to said called user terminal, said leading packet containing said call identifier,
means at said first and second user-plane network entities for forwarding user-plane voice packets sent by said calling user terminal and provided with said call identifier to said called user terminal over said logical user-plane channel.

28. A system according to claim 27, further comprising
means for inquiring an IP address of second communication entity from a communication control server on the basis of said identity of said receiving user,
means for routing said leader packet and subsequent voice packets to said IP address of said second communication entity.

29. A system according to claim 27, wherein said means for creating a logical channel comprises means for initiating, in response to receiving said embedded call setup signaling from said calling subscriber, a control-plane procedure to program said user-plane entities which are to be involved with routing of the call related user-plane traffic, to support said call.

30. A system according to claim 29, comprising
a first user-specific control-plane entity serving said calling user,
a second user-specific control-plane entity serving said called user,
said means for initiating said control-plane procedure comprising means for sending an event notification message from said user-plane entity of said calling user to said first control-plane entity, said notification message indicating that a one-to-one call is to be set up and containing said identifiers of said calling and called user,
said first control-plane entity comprising means for determining, on the basis of said identity of said called user, said second user-specific control-plane entity,
said first control-plane entity comprising means for requesting said second control-plane entity to define said user-plane entity of said called user to support said call and to establish said user-plane logical channel,
said first control-plane entity comprising means for configuring said control-plane entity of said calling user to support said call and to establish said user-plane logical channel.

31. A system according to any one of claims 27 to 30, wherein said means for notifying said call identifier comprises means for sending a user-plane call setup acknowledgement packet containing said call identifier from said user-plane network entity of said calling user terminal to said calling user terminal.

32. A system according to claim 31, wherein said calling user terminal is arranged to start transmission of said subsequent voice packets from said calling user in response to said notifying.

33. A system according to any one of claims 27 to 30, wherein said called user terminal is arranged to send a user-plane reception acknowledgement packet to said user-plane network entity of said called user in response to receiving said user-plane leading packet.

34. A system according to claim 33, comprising means for sending, in response to receiving said user-plane reception acknowledgement packet from said called user, a user-plane call setup acknowledgement packet from said user-plane entity of said called user to said user-plane entity of said calling user, and means for sending a user-plane call setup acknowledgement packet from said user-plane entity of said calling user to said calling user terminal in order to enable the calling user to send the subsequent user-plane voice packets.

35. A system according to claim 33, wherein said user-plane entity of said called user considers said called user unreachable in response to not receiving a reception acknowledgement packet within a preset timeout, and notifies said calling user of said unreachability.

36. A system according to any one of claims 27 to 30, wherein said leading packet contains a description of communication capabilities said calling user wishes to use in said call.

37. A system according to claim 36, wherein said called user terminal comprises means for sending a negative user-plane acknowledgement packet to its user-plane network entity if said called user terminal does not support said communication capabilities described in said leading packet.

38. A system according to claim 37, wherein said negative user-plane acknowledgement packet contains a description of the communication capabilities said called user wishes to use.

39. A system according to any one of claims 27 to 30, wherein said user-plane packets are real-time audio transport packets, and wherein said user-plane leading packet is a real-time audio transport packet having a specific payload type.

40. A system according to claim 31, wherein said user-plane packets are real-time audio transport packets, and wherein said user-plane call setup acknowledgement packet is a real-time audio transport packet having a specific payload type.

41. A network element for a communication system, said network element comprising a dedicated user-plane logical network entity for at least one user terminal supporting a one-to-one voice communication, said user-plane network entity comprising (i) means for receiving a user-plane leader packet sent by a calling user terminal in order to start a one-to-one voice call, said leader packet containing identifier of a calling user and a called user, (ii) means for creating a logical channel to a user-plane network entity of said called user terminal in response to receiving said user-plane leader packet, (iii) means for assigning a call identifier, (iv) means for notifying the calling user terminal of said call identifier by a user-plane communication, (v) means for sending a user-plane leader packet from said second user-plane entity to said called user, said leader packet containing said call identifier, (vi) means for forwarding user-plane voice packets sent by said calling user terminal and provided with said call identifier to said user-plane network entity of said called user terminal over said logical channel.

42. A user terminal for a communications system, said user terminal comprising a one-to-one call setup mechanism sending a user-plane leader packet to one of a plurality of logical user-plane network entities in order to start a one-to-one voice call by call setup signaling embedded in user-plane traffic sent from a calling user to a called user, said leader packet containing an identifier of the calling user and the called user, means for starting to send user-plane voice packets to said one of said plurality of logical user-plane network entity entities in response to receiving a user-plane call setup acknowledgement packet containing a call identifier assigned to a call, whereby said user plane voice packets containing said call identifier are forwarded over a logical call path established by ones of said plurality of logical user plane network entities for said call from said calling user to said called user in response to said embedded call setup signaling.

43. A user terminal according to claim 41, wherein said user-plane leader packet contains a description of the communication capabilities said user terminal wishes to use.

44. A user terminal according to claim 42, comprising means for receiving from said user-specific user-plane network entity a user-plane leader packet originating from another user terminal and containing a call identifier, means for sending a user-plane reception acknowledgement to said user-specific user-plane network entity.

45. A user terminal according to claim 42, comprising means for receiving from said user-specific user-plane network entity a user-plane leader packet originating from another user terminal and containing a description of the communication capabilities said other user terminal wishes to use, means for sending a negative user-plane acknowledgement packet to said user-specific user-plane network entity, if said called user terminal does not support said communication capabilities described in said leading packet, and sending a positive user-plane acknowledgement otherwise.

46. A user terminal according to claim 42, wherein said user-plane packets are real-time audio transport packets, and wherein said user-plane leading packet is a real-time audio transport packet having a specific payload type.

47. A user terminal according to claim 44, or 46, wherein said user-plane packets are real-time audio transport packets, and wherein said user-plane acknowledgement packet is a real-time audio transport packet having a specific payload type.

* * * * *